United States Patent

[11] 3,587,817

| [72] | Inventors | Rene Bornstein<br>Antony;<br>Gerard Dubus, Combs-La-Ville, France |
|---|---|---|
| [21] | Appl. No. | 729,672 |
| [22] | Filed | May 16, 1968 |
| [45] | Patented | June 28, 1971 |
| [73] | Assignee | Service D'Exploitation Industrielle Des<br>Tabacs Et Des Allumettes<br>Paris, France |
| [32] | Priority | May 17, 1967 |
| [33] | | France |
| [31] | | 106641 |

[54] METHOD OF TRANSFERRING OBJECTS BETWEEN MOVING CONVEYORS
4 Claims, 5 Drawing Figs.

[52] U.S. Cl. .................................................. 198/20, 198/177
[51] Int. Cl. .................................................. B65g 47/00
[50] Field of Search............................................198/177, 20

[56] References Cited
UNITED STATES PATENTS

| 1,951,400 | 3/1934 | Duorak | 198/177 |
| 2,796,974 | 6/1957 | Weinberger | 198/177 |
| 2,918,164 | 12/1959 | Austin et al. | 198/177 |
| 2,929,487 | 3/1960 | Lisowski et al. | 198/20 |

Primary Examiner—Evon C. Blunk
Assistant Examiner—Douglas D. Watts
Attorney—Sparrow and Sparrow ABSTRACT: Apparatus for effecting a transfer in a determinate zone, hereinafter termed the transfer zone, of loads conveyed by continuously moving carrier elements from said elements to an intermediate transfer support or mobile relay, of the kind comprising control means of the motion of said intermediate support so devised that said support follows a trajectory of which a portion at least intersects the trajectory of said carrier elements within said transfer zone, said control means and said carrier elements being so devised that the motion of the carrier element involved in the transfer over that part of its trajectory which corresponds to said transfer zone causes said intermediate support to move over a corresponding part of its own trajectory, to wit the part thereof which likewise extends through said transfer zone, whereby said carrier element and said intermediate support reach the point of intersection of their trajectories at the same instant.

METHOD OF TRANSFERRING OBJECTS BETWEEN MOVING CONVEYORS

The present invention relates to the automatic and selective loading and unloading of the carrier elements of an endless conveyor, such elements being devised to ensure stability of the goods transported while at the same time imparting to them the motion defined by the conveyor driving system. A big proportion of the endless conveyors used in modern converter industries belong to this type, which will hereinafter be referred to as "continuous conveyors of successive deposited units." They are particularly suited to the transport of goods which do not lend themselves to bulk handling, due for example to their fragility. They are especially suitable for linking a group of article-producing machines (hereinafter referred to as the "production group") and a group of machines using these articles (hereinafter termed "consumer group"). Such continuous conveyors are characterized by the flexibility they introduce into operations, since it is possible to constitute an immediately usable stock of varying size of semiworked articles by multiplying the carrier elements and by possibly extending the path of the conveyor beyond that imposed by the locations of the machines to be served. When, because of their nature, such semiworked articles have to be conveyed into containers or receptacles which are themselves loaded on to carrier elements (and consequently constitute the "transported goods"), the return of the empty receptacles from the machines in the consumer group to the machines in the production group can be effected with advantage by the same conveyor or by a conveyor with identical carrier elements. This makes it possible to standardize the various component parts and to regard the problem of returning the receptacles exactly in the same way as the problem of linking the production group with the consumer group. The foregoing considerations bring out the advantages of continuous conveyors of successive deposited units and make it possible to better comprehend the utility of loading and unloading the carrier elements automatically and selectively. The "stocking" function of such a conveyor will be all the more valorized as, each time a demand emanates from a consumer-group machine, one can be certain that the first carrier element that bears appropriate goods thereon and is fetched proximate the demanding machine by the conveyor will be unloaded and the goods transferred to the utilization station. This is also true in respect of removal of the products from the machines in the production group. Such removal will be effected under optimum conditions by the nearest available carrier element located past the machine on which the volume of semiworked articles has reached a certain threshold. A similar problem arises when it is necessary to discharge and return the receptacles containing the articles. The greater the number of machines to be served by the same conveyor and the higher the production rates (thus multiplying the frequency of the loading and unloading operations), the harder it becomes to rely on the diligence of the personnel employed for effecting reciprocal transfers between the conveyors and machines. In such cases it is either necessary to employ more labour than is strictly essential (the more so in that the production and consumer rates of the machines will vary on a medium-term basis) or to undertake full automation of the transfers.

A satisfactory solution to this problem, this problem, perfectly suited to the continuous motion of the carrier elements, was disclosed in the applicant's copending application Ser. No. 683,972 dated Nov. 17, 1967. This solution was specifically adapted to an overhead conveyor in which the carrier elements, then termed swing-carriers, travel at a level below that of the drive system (which could be a chain, a cable, a helicoid rod, or the like, interconnecting the carriages from which the swing carriers are dependent, unless the carriages are made self-driven, which is seldom justified). The case specifically considered was that in which the swing carriers were formed with an upturned concave open profile. This offered the best guarantee of stability for the goods being conveyed, by virtue of the effect of their own weight, but this entailed an important limitation since the swing carriers possessed a volume containing part of the goods which was located at a level below that of the open section for withdrawing or depositing the goods. Therefore in order to move the goods completely on to an intermediate transfer support of similar profile and function to those of the carrier elements in the course of crossing such an element, it was necessary for this relative motion to have an ascending component. In the above patent application, the vertical component required for this motion resulted solely from the trajectory of the swing carriers through the relevant transfer zone (the intermediate transfer support, or relaying support, being halted during the operation). This solution, which further enables selective unloading to be based on mere retraction of the relaying support (such retraction being made possible in the transfer zone itself by a special design feature), calls for a special configuration in the track for guiding the swing-carrier-supporting carriages, it being necessary for the track to follow a generally downward path through each unloading zone, i.e. adjacent each receiving machine. It will be appreciated that, conversely, loading the conveyor requires a generally ascending portion of the guiding track adjacent each producing machine.

These changes in the level of the track present two major drawbacks: first, they require a greater ceiling height than a horizontal track and, second, they determine once and for all the abscissa-wise locations—unless the track be modified—of the associated machines. In some cases these drawbacks can prove decisive impediments for such a system.

A different solution of for a similar problem was disclosed in the applicant's copending application Ser. No. 570,321 dated Aug. 4, 1966. In this case the vertical component of the relative motion stems from the trajectory imparted to the relaying support, for loading and unloading alike, the carrier elements being then halted. In this case also, a carrier element and a relaying support are caused to cross each other, during which a goods load is transferred from the one to the other, and here again the goods and the support (of the relay or the carrier element) come into mutual contact simultaneously at several points (usually not all in the same plane), one of these supports being halted. Both these operations are effected under a classic load-transferring method that calls for geometrically precise locations on the trajectories only when it is desired to avoid impacts and slipping, but which conversely is not very exacting in the matter of synchronization of the motions.

Another, at first glance more difficult, solution exists in which it is assumed that the goods and the support on to which they must be transferred are each possessed of individual motion. For contact to take place between them in the appropriate position, it is then necessary for the two motions to be perfectly synchronized through the transfer zone. If the goods follow a horizontal translation trajectory, the vertical component of the relative motion will be given by the ascending motion of the support (in this case an unloading relay support); conversely, if the support to be loaded (a carrier element) follows a horizontal trajectory, the goods carried by the relay support will be possessed of descending motion, thereby furnishing the vertical component of the relative motion.

The present invention comes under this general category and relates to a method of carrying out this kind of transfer without danger of impact or sliding, and to means for synchronizing the motions called for by this method that utilize simple and reliable component parts.

The invention is by no means limited to transfers from or to overhead conveyors, but can be applied equally to all types of conveyor in which the carrier elements present their load with a sufficiently unobstructed open section turned upwardly and facing the "upflow" direction.

Similarly, the invention in no way excludes applications in which the conveyors follow paths embodying extensive accidental or systematic changes of level, those in which batches of goods conveyed by the same carrier element have no inherent cohesion (provided they have sufficient rigidity), those in which goods belonging to different batches have different external volumes (provided the latter match the shape of the carrier elements and relay supports), or those in which the characteristics of the goods destine the latter for different machines in the consumer group. Indeed many changes may be made without departing from the underlying principles of the invention.

The present invention relates to a mechanized method of loading or unloading goods conveyed by carrier elements in a continuous and substantially horizontal motion, by means of an intermediate transfer or relay support capable of reciprocating motion having a vertical component in the goods transfer zone, whereby to allow a batch of goods to be discharged above the level of the open section of a carrier element, said method being characterized in that the motion of the relay support is, during the upward or downward transit through part of the transfer zone, governed by a characteristic part of the motion of the carrier element considered.

Dependency of the motion of the relay support upon that of the carrier element can be obtained by means of a mechanical coupling.

The motion of each relay support away from the transfer zone may be defined by a drive system other than that associated to the carrier elements.

The drive system specific to the relay support is capable of positioning the latter beneath the plane bounding the transfer zone, the presence of the support at that level being indicated by at least one projecting element adapted to couple the motions of the relay support with that of the first carrier element crossing the transfer zone.

A description will now be given of an example of application of the subject method of this invention to objects such as the racks or bins used for transport between cigarette-making machines and cigarette-packaging machines. This example is a good illustration of the possibilities of the invention, the goods involved being fragile and the cigarettes being merely deposited in the bins with there axes parallel, their stability and direction being primarily ensured by the fact that the bin slopes lightly towards its large closed face. Consequently it will be appreciated that all the handling operations must not affect this slope, or at the most modify it only very progressively. Another feature of this type of goods is the absence of cohesion in each batch of bins to be processed, since the sets of bins supplied by any one machine, or to be returned together, are not interconnected but merely juxtaposed in orderly fashion. Their most suitable feature from the standpoint of this handling method is the constancy of their external form. Such absolute constancy is not indispensable, however, and there are numerous industries in which the degree of constancy would be adequate.

The example of application of the subject method of this invention will therefore be described with reference to the accompanying drawings, in which.

Figure 1:
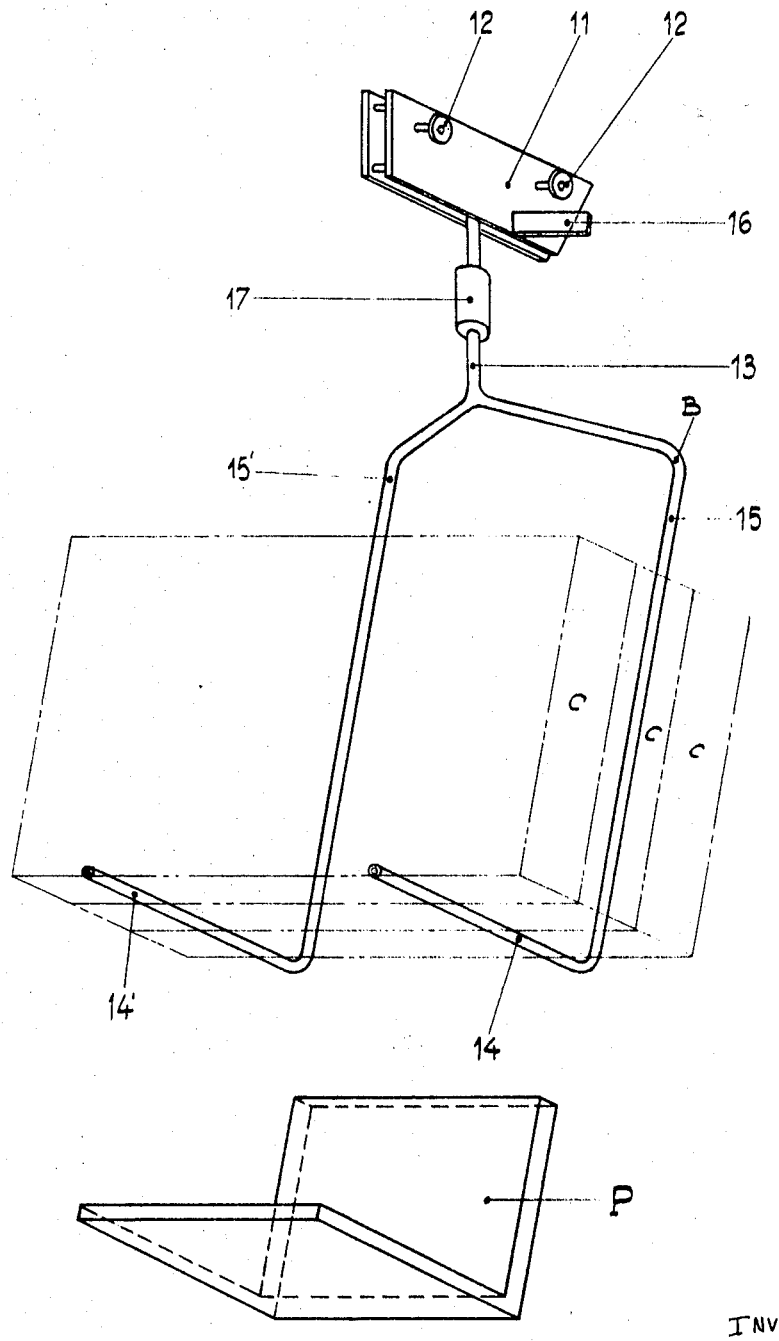
FIG. 1 shows in perspective a carrier element of the conveyor used and the active portion of the relay support.

Referring first to FIG. 1, the solid lines thereon show a swing carrier B representing an example of a carrier element for goods such as cigarette bins C portrayed in dot-dash lines. The bins C are carried on rigid rods 14 forming part of the swing carrier and bear against further rods 15 which, through the agency of a forked member, join the rods 14 to a common suspension rod 13. This conventional arrangement make it possible to provide a large entry or exit section for the goods transported, which section is defined by a plane through the uppermost ends of the rods 14. This plane is represented by the dot-dash line S in FIGS. 2 and 3. In order that this exit section should go increasing during nonstop unloading of a swing carrier B, the latter must travel in the direction of the arrow F2 in FIG. 2. Conversely, for loading the bins, the entry section will go diminishing by reason of the motion of the swing carrier, the latter then travelling in the direction of arrow F3 in FIG. 3. Therefore the swing carriers must present themselves with reverse profiles when the conveyor bears them towards loading and unloading stations, respectively. Accordingly, the suspension rod 13 has interposed thereon a reversing attachment 17 of a known type. The swing-carrier-supporting carriages 11 travel on wheels 12 along a track symbolized by the letter V and are interconnected by pulling means such as a chain which also runs along the track V. By causing this chain to move at a constant speed, the swing carriers and their loads are driven in continuous motion. It is well known that this type of conveyor, called an overhead conveyor, will readily accommodate big changes in direction and elevation in its routing. In the present example, however, the track will be assumed to be constantly horizontal, thereby testifying to the adaptability of the invention to other types of conveyor.

Figure 2:
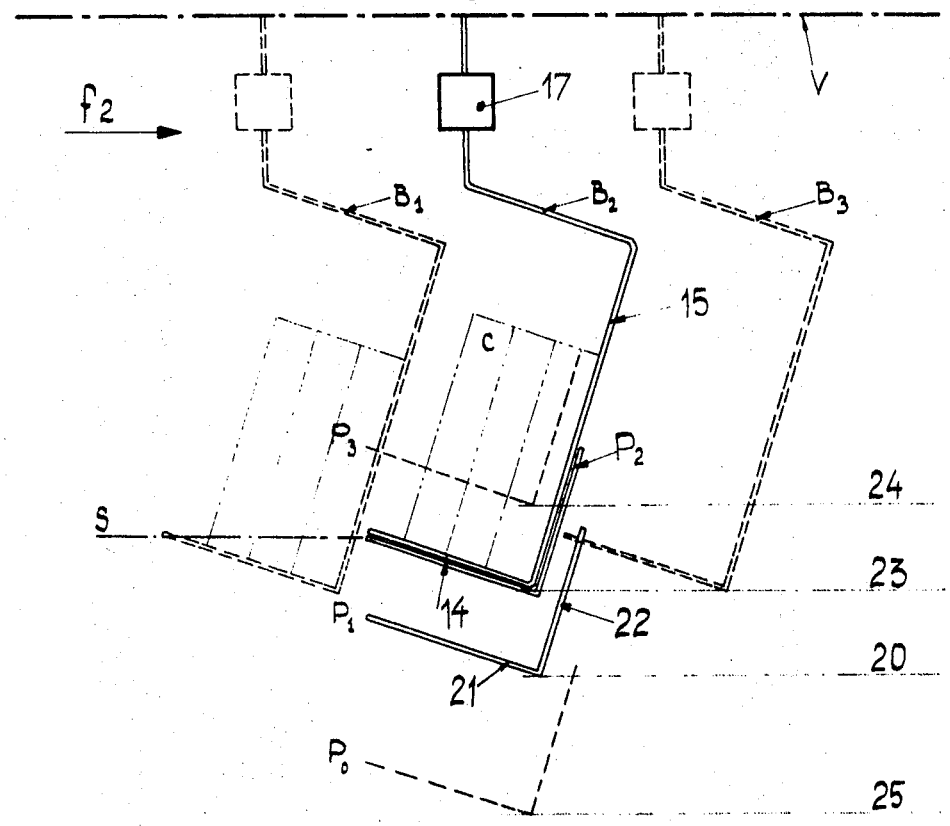
FIG. 2 shows in diagrammatic side elevation an operation of unloading a carrier element by means of a relay support.
Figure 3:
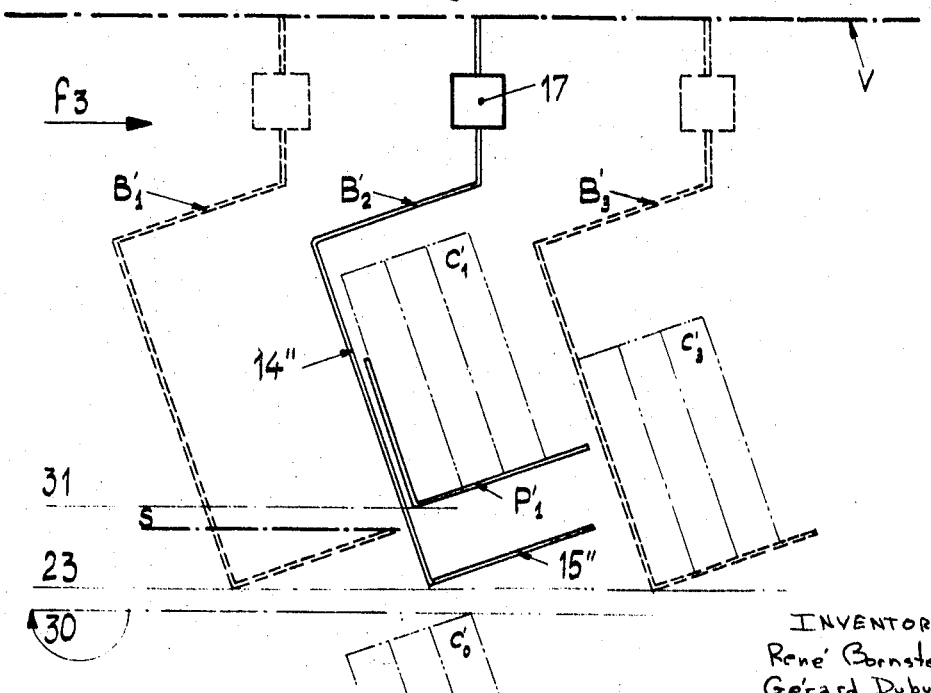
FIG. 3 shows in diagrammatic side elevation an operation of loading a carrier element by means of a relay support.

The swing-carrier-loading or unloading vehicle, hereinbefore termed "relay support" and hereinafter more simply referred to as the "shovel" in the example considered, is represented by its useful profile 21–22 on FIGS. 2 and 3 and is schematized at P in FIG. 1. Its active portion consists of two flat surfaces, of which one, corresponding to 21, is adapted to contact the bottom of the bins, and the other, corresponding to 22, to contact the large bin face adjacent the swing carrier (before unloading or after loading). The horizontal dimensions of its surfaces are sufficient for them to be able to pass between the rods 14–15 and 14'–15' forming the swing carrier framework. In its unloaded condition, the shovel P is therefore able to cross an empty swing carrier without contact taking place therebetween. Manifestly, it would alternatively be possible for a relay support to consist of a straddling arrangement of two portions between which the swing carrier would pass. The copending application Ser. No. 683,972 referred to precedingly gives an example of such a support. But the subject method of the invention would enable the flaps provided on this support to remain fixed.

The shovel P is possessed of reciprocating motion assumed in the present example to follow a vertical path. This is not an imperative requirement however, since it will suffice to impart a vertical component to the motion of shovel P through the transfer zone in performing the subject method of the invention. Similarly, the rising trajectory could be different from the descending trajectory. In the example hereinbefore described, it is preferred to assume that the two trajectories lie in the same path, as this has the advantage of requiring only a single guide member for shovel P, of the kind for example described in the copending application Ser. No. 570,321 referred to precedingly in respect of transfer arms performing a similar function. A shovel P can then be located, for instance, by a chain which is partly visible at 48 in FIG. 4, which chain is customarily driven by a sprocket which is in turn driven by a reversible braking motor/reduction gear unit 106,107 of conventional type through the medium of a remote-control electromagnetic clutch 108. By means of this motor the empty shovel P can be fetched at will to the level 20 in FIG. 2 (a level below that of the lowermost point on the swing carriers), or made to descend either to a standby level suitable for a shovel loaded with bins, or lower still in readiness for a transfer on to another conveyor, as explained in the above-cited patents. Similarly, to transferring the bins from the machines to the swing carriers, a drive unit of a similar kind could be used to cause a shovel P' (FIG. 3) to collect a set of bins from a machine located beneath the medium of the conveyor track V, to ascend if required into a standby position, or to penetrate into the gap between two consecutive swing carriers while preceding a full swing carrier up to the uppermost point in its path, represented at P'$_1$ in FIG. 3. These operations, for which a relatively large time interval is available (because of the moderate speed of the swing carriers and their relatively large spacing, and because of the low frequency of the maneuvers involving any given machine), may be fully automated without requiring complicated or fragile servosystems.

This is not so in the case of synchronization of the motion of the loaded swing carrier schematized at B1 (FIG. 2) which comes proximate the relay support 21–22 (halted at level 20 in a ready-to-load position) if it is required to fetch the two dot-dash profiles 14–15 and 21–22 into perfect coincidence at the exact moment when the swing carrier reaches the position B2. The same difficulty exists for precisely positioning the shovel represented at $P'_1$ in FIG. 3 (the swing carrier being then at $B'_1$) into coincidence of profile with the branches 14'' and 15'' of the same swing carrier when the latter occupies the position $B'_2$. It is an essential teaching of the present invention that these maneuvers are made convenient, precise, and reliable by using the continuous motion of the swing carrier or its associated pulling element to determine the motion of the shovel.

Figure 4:
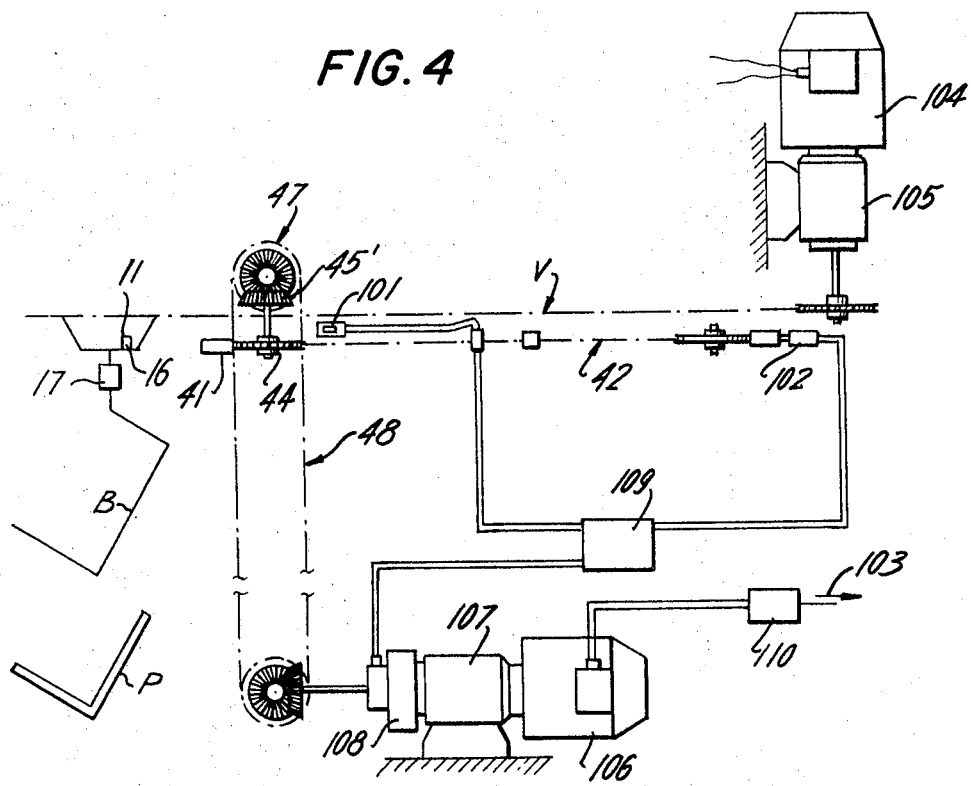
FIG. 4 shows in diagrammatic side elevation a mechanism for coupling the motions of the carrier element and the relay support.
Figure 5:
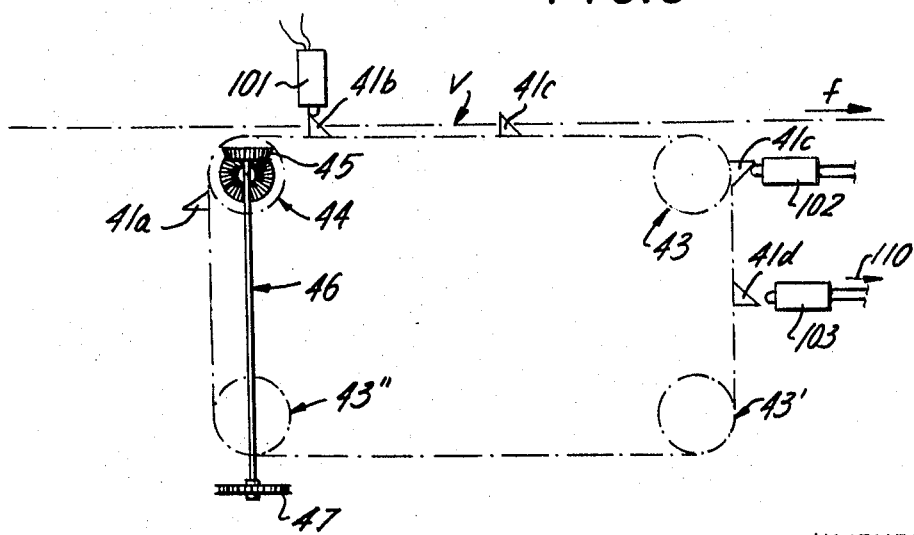
FIG. 5 shows the mechanism of FIG. 4 in diagrammatic plan view.

A mechanism which is necessary for this operation is schematized in FIGS. 4 and 5. Visible in FIG. 4 is the swing carrier B, its carriage 11 with the peg 16, and the track V. Reference numeral 47 designates a sprocket for reversing the direction of chain 48, which chain governs the motion of shovel P or restrains it in the required position. Sprocket 47 is angularly rigid with a horizontal shaft 46 supported in fixed bearings and carrying at its other end a bevel pinion 45 meshing with a like pinion of vertical axis, whereby to form a bevel coupling of demultiplication assumed to be equal to unity. Obviously, any other convenient demultiplication ratio could be adopted for the transmitted motion, though this is not absolutely necessary provided certain precautions are taken.

The vertical-axis pinion 45' of the bevel coupling is rigid with a sprocket 44 which is the drive-imparting wheel for the system in its operative phase. An endless chain 42 runs over sprocket 44 and over three intermediate sprockets 43, 43', 43'' which are freely rotatable on fixed vertical shafts except for the provision of location and tension adjusting means. In the manner well known per se, the chain 42 carries, fixed to one of its links, and angled catch member 41 adapted to engage with a peg 16 welded to a carriage 11.

The theory of operation of the system hereinbefore described is easy to comprehend. It will be described with reference to loading of a swing carrier by a shovel feeding a consumer-group machine M, not shown (see FIG. 3), but it will be manifest that there would be no difficult in adapting to other contingencies without fundamentally altering the principles involved.

It is proposed to start from the moment when the machine M has room to receive a batch of cigarette bins. The shovel P will in most cases have been loaded with such bins during a previous operation and will deposit them on the conveyor, for instance as described in one of the applicant's aforesaid patents. Immediately after such deposit is effected the shovel will move into the position $P_o$ (lowermost point at level 25) in which it permits the transit above it of empty or full swing carriers, with the full swing carriers carrying any category of bins (empty, full of cigarettes not suitable for the machine M, or full of cigarettes suitable for the machine M). Only the last-mentioned category must be taken into account, however, so that as soon as a swing carrier of this category arrives at an appropriate distance from the machine M (by "appropriate distance" is meant that the preceding swing carrier must have already reached a position such as that designated by B3, in which the shovel can no longer encounter any bins which may be there), a detector 101 of any convenient kind may trigger the unloading process.

As soon as the signal from the detector 101 is received, the tracking motor/reduction gear 106,107 unit referred to previously is started up and the drive engaged immediately to the main sprocket driving the chain 48, whereby to fetch the shovel into the position $P_1$ (preliminary to takeup). Through the medium of coupling 45 and sprockets 47 and 44, this motion will have displaced the catch 41 from position 41a (corresponding to $P_o$ and such that the catch 41 escapes from the pegs 16 of the swing carriers travelling along track V) to position 41b. The drive from the motor/reduction gear will then be disengaged automatically (by means, for instance, of a contact switch 101 positioned level with 41b) but the brake motor will continue to rotate in the same direction. Immediately afterwards the swing carrier will reach the position shown at $B_1$ in FIG. 2 and the peg 16 will engage the catch 41. The chain 42 will then impart drive once more and bevel coupling 45 will allow the shovel to continue to ascend at the appropriate speed for fetching the profiles 21–22 and 14–15 into coincidence exactly at the moment when the swing carrier reaches $B_2$. The catch 41 will then occupy the position 41c and will be able to reengage the drive from the motor/reduction gear. The chain 48 will impart drive once more and will speed up the motion of the shovel P which, loaded with bins C, will rise to the position P3 (the catch being at 41c) whereat the motor will be stopped automatically by means, say, of a microswitch 102. During this time the swing carrier will have reached a position such as B3. It will be appreciated that it will then be possible to restart the motor/reduction gear unit 106,107 immediately in reverse so as to clear the bins C away from the path of the swing carriers and into the standby position located immediately beneath 25, for example, where they will be available at the first demand emanating from the machine M. Obviously, the length of chain 42 must be such that, when the shovel P is at its lowermost level (the level for transfer to machine M), the catch 41 does not overshoot the position 41d switch 103 where it cannot encounter a peg 16.

It goes without saying that many changes and substitutions of parts may be made to the specific form of embodiment hereinbefore described, without departing from the scope of the invention.

We claim:

1. A mechanism for use in a conveyor system having an endless conveyor comprising a plurality of carrier elements, means for driving said conveyor whereby having said carrier elements follow a first path, an intermediate support adapted to follow a second path intersecting said first path, means for conveying said intermediate support along said second path, and power means for driving said support conveying means; said mechanism comprising first means for disengaging said driving power means from said support conveying means when said intermediate support reaches a first determined point of said second path near the intersecting point of said first and second paths, second means for positively connecting said carrier elements conveyor and said intermediate support conveying means whereby synchronizing the movement of said intermediate support with the movement of said carrier elements from said first point of said second path to a second point of said second path, and third means for reengaging said driving power means and said intermediate support conveying means when said intermediate support reaches said second point of said second path.

2. Apparatus according to claim 1, wherein said power means comprises drive means for moving said intermediate support out of said transfer zone independently of said carrier element.

3. Apparatus according to claim 1, further comprising a mechanical coupling and a first member connected to said carrier, said coupling connecting said intermediate support being driven by a carrier element through said transfer zone, said first member connected to said carrier element, and a second member connected to said intermediate support.

4. Apparatus according to claim 3, wherein said coupling members consist of catch members which abut against each other over part of their trajectories.